United States Patent
Ferrie et al.

(10) Patent No.: US 10,318,250 B1
(45) Date of Patent: Jun. 11, 2019

(54) SYSTEMS AND METHODS FOR LOCATING FUNCTIONS FOR LATER INTERCEPTION

(71) Applicant: Symantec Corporation, Mountain View, CA (US)

(72) Inventors: Peter Ferrie, Los Angeles, CA (US); Vishal Saxena, Tustin, CA (US)

(73) Assignee: Symantec Corporation, Mountain View, CA (US)

( * ) Notice: Subject to any disclaimer, the term of this patent is extended or adjusted under 35 U.S.C. 154(b) by 33 days.

(21) Appl. No.: 15/462,390

(22) Filed: Mar. 17, 2017

(51) Int. Cl.
 *G06F 8/30* (2018.01)
 *G06F 11/36* (2006.01)
 *G06F 21/56* (2013.01)

(52) U.S. Cl.
 CPC .......... *G06F 8/311* (2013.01); *G06F 11/3612* (2013.01); *G06F 21/566* (2013.01)

(58) Field of Classification Search
 CPC ....................................... G06F 8/311
 USPC ....................................... 717/157
 See application file for complete search history.

(56) References Cited

U.S. PATENT DOCUMENTS

| 6,026,235 | A  | * | 2/2000  | Shaughnessy | G06F 11/3466 714/E11.2 |
| 7,058,941 | B1 | * | 6/2006  | Venkatesan | G06F 8/658 717/168 |
| 7,757,224 | B2 | * | 7/2010  | Forin | G06F 8/447 717/157 |
| 2004/0088684 | A1 | * | 5/2004  | Gazdik | G06F 9/4486 717/133 |
| 2006/0026571 | A1 | * | 2/2006  | Cabillic | G06F 9/30174 717/133 |
| 2011/0321021 | A1 | * | 12/2011 | Chen | G06F 8/4442 717/157 |
| 2015/0058605 | A1 | * | 2/2015  | Madampath | G06F 9/30058 712/234 |
| 2016/0072833 | A1 | * | 3/2016  | Kim | G06F 16/334 726/23 |
| 2016/0292276 | A1 | * | 10/2016 | Denninghoff | H03H 9/02622 |

* cited by examiner

*Primary Examiner* — James D. Rutten
(74) *Attorney, Agent, or Firm* — FisherBroyles, LLP

(57) ABSTRACT

The disclosed computer-implemented method for locating functions for later interception may include (i) identifying a function to be intercepted during an execution of a file that comprises an instance of the function, (ii) procuring, from a description of the function, a string that, when located in any given file within a set of files, indicates a location of the function within the given file, (iii) scanning the file to identify a location of the string within the file, (iv) determining, based on the location of the string within the file, a location of the instance of the function within the file, and (v) intercepting a call made by a process during the execution of the file to the instance of the function based on having located the instance of the function within the file. Various other methods, systems, and computer-readable media are also disclosed.

19 Claims, 7 Drawing Sheets

SYSTEMS AND METHODS FOR LOCATING FUNCTIONS FOR LATER INTERCEPTION

BACKGROUND

Many applications that execute on computing systems employ function calls to perform a variety of tasks. Functions may be written to handle anything from simple tasks like reformatting a string or performing a calculation to complex tasks such as retrieving data, transferring files, encrypting information, or creating a network connection. Typically, a function may only be visible to other code within the same application. However, some applications are designed to intercept calls to functions within other applications. Intercepted function calls can then be blocked or, in some cases, redirected to other functions that may perform the same task in different ways or may perform a different task entirely.

Traditional systems for intercepting function calls require the intercepting application to know the location of the function to be intercepted. Some traditional systems may perform an analysis of all possible code paths in a file in order to identify the locations of functions. Such an analysis may be lengthy and may also be costly in terms of computing resources. Additionally, traditional systems that analyze files to identify the locations of functions may have to perform a separate analysis of each new version of a file to determine whether the location of the function has changed in the new version and if so, what the new location of the function is. The instant disclosure, therefore, identifies and addresses a need for systems and methods for locating functions for later interception.

SUMMARY

As will be described in greater detail below, the instant disclosure describes various systems and methods for locating functions for later interception.

In one example, a computer-implemented method for locating functions for later interception may include (i) identifying a function to be intercepted during an execution of a file that includes an instance of the function, (ii) procuring, from a description of the function, a string that, when located in any given file within a set of files, indicates a location of the function within the given file, (iii) scanning the file to identify a location of the string within the file, (iv) determining, based on the location of the string within the file, a location of the instance of the function within the file, and (v) intercepting a call made by a process during the execution of the file to the instance of the function based on having located the instance of the function within the file.

In some examples, the file may include a dynamic linked library. In one embodiment, the description of the function may include an instance of the function in a previously analyzed file. In some examples, the computer-implemented method may further include redirecting the intercepted call made by the process to a predetermined replacement function.

In one embodiment, the string may include a sequence of opcodes. In one embodiment, the string may include a set of substrings and scanning the file to identify the location of the string within the file may include scanning the file for a group of different orderings of the set of substrings. In some examples, the string may include a combination of at least one static substring that only matches an exact copy of the static substring and at least one variable substring that matches substrings other than an exact copy of the variable substring. In one embodiment, the string may include a series of instructions within the function that uniquely identify the function within the set of files. In one embodiment, the set of files may include a group of versions of the file.

In some examples, scanning the file to identify the location of the string within the file may include (i) identifying a possible location of the string within the file, (ii) identifying information at the possible location of the string within the file that indicates a presence of additional information about the location of the function at an additional location within the file, and (iii) searching for the additional information about the function at the additional location within the file. In one embodiment, identifying the information at the possible location of the string within the file may include identifying a conditional branching instruction that branches to the additional location and searching for the additional information about the function at the additional location may include following the conditional branching instruction to the additional location.

In one embodiment, a system for implementing the above-described method may include (i) an identification module, stored in memory, that identifies a function to be intercepted during an execution of a file that includes an instance of the function, (ii) a procuring module, stored in memory, that procures, from a description of the function, a string that, when located in any given file within a set of files, indicates a location of the function within the given file, (iii) a scanning module, stored in memory, that scans the file to identify a location of the string within the file, (iv) a determination module, stored in memory, that determines, based on the location of the string within the file, a location of the instance of the function within the file, (v) an intercepting module, stored in memory, that intercepts a call made by a process during the execution of the file to the instance of the function based on having located the instance of the function within the file, and (vi) at least one physical processor configured to execute the identification module, the procuring module, the scanning module, the determination module, and the intercepting module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a function to be intercepted during an execution of a file that includes an instance of the function, (ii) procure, from a description of the function, a string that, when located in any given file within a set of files, indicates a location of the function within the given file, (iii) scan the file to identify a location of the string within the file, (iv) determine, based on the location of the string within the file, a location of the instance of the function within the file, and (v) intercept a call made by a process during the execution of the file to the instance of the function based on having located the instance of the function within the file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Figure 1:
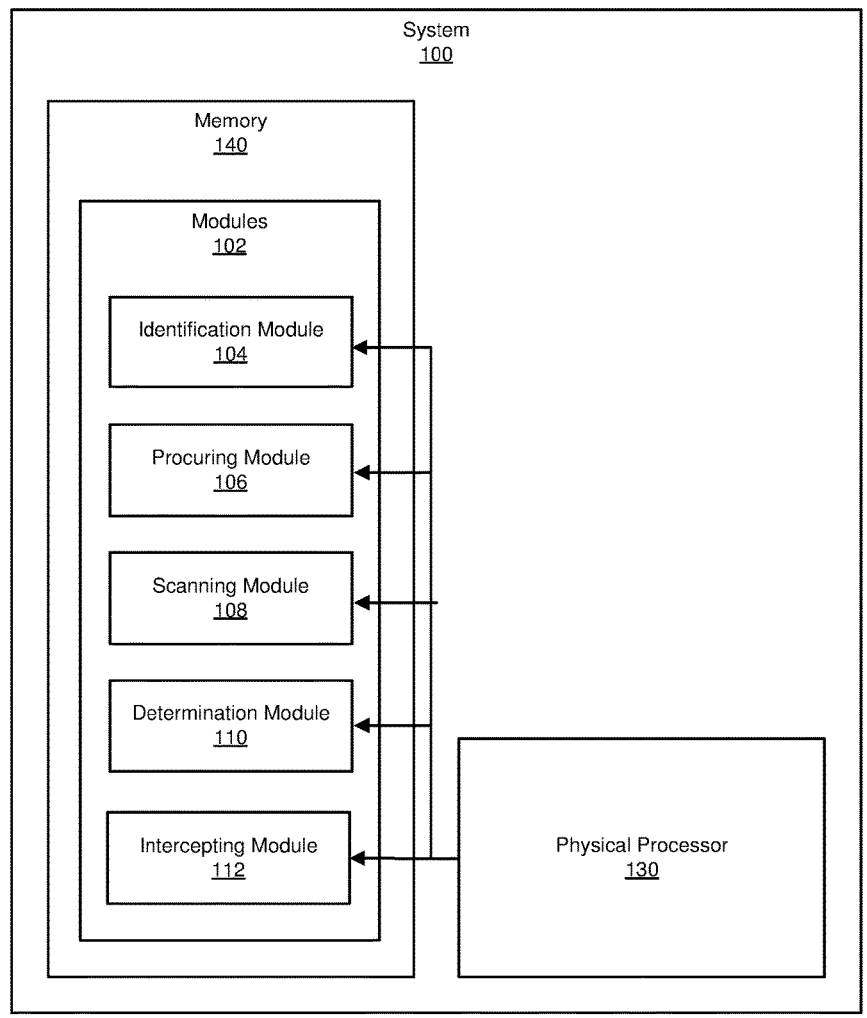
FIG. 1 is a block diagram of an example system for locating functions for later interception.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for locating functions for later interception. As will be explained in greater detail below, by scanning files for a string that indicates the location of a function, the systems and methods described herein may be able to efficiently locate functions in files without executing the files and/or performing a costly analysis of the code in the files. By efficiently locating files this way, the systems and methods described herein may be able to minimize the use of computing resources necessary to locate functions in files and/or store locations of functions in previously-analyzed files. In addition, the systems and methods described herein may improve the functioning of a computing device by improving the ability of the computing device to intercept functions called by various files, thus improving the functioning of various security, accessibility, and/or other beneficial applications.

The following will provide, with reference to FIGS. 1, 2, and 4, detailed descriptions of example systems for locating functions for later interception. Detailed descriptions of corresponding computer-implemented methods will also be provided in connection with FIGS. 3 and 5. In addition, detailed descriptions of an example computing system and network architecture capable of implementing one or more of the embodiments described herein will be provided in connection with FIGS. 6 and 7, respectively.

Figure 2:
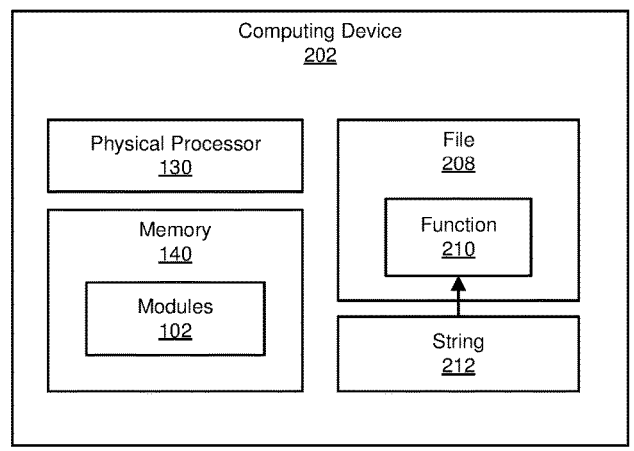
FIG. 2 is a block diagram of an additional example system for locating functions for later interception.

FIG. 1 is a block diagram of example system 100 for locating functions for later interception. As illustrated in this figure, example system 100 may include one or more modules 102 for performing one or more tasks. For example, and as will be explained in greater detail below, example system 100 may include an identification module 104 that identifies a function to be intercepted during an execution of a file that includes an instance of the function. Example system 100 may additionally include a procuring module 106 that procures, from a description of the function, a string that, when located in any given file within a set of files, indicates a location of the function within the given file. Example system 100 may also include a scanning module 108 that scans the file to identify a location of the string within the file. Example system 100 may additionally include a determination module 110 that determines, based on the location of the string within the file, a location of the instance of the function within the file. Example system 100 may also include an intercepting module 112 that intercepts a call made by a process during the execution of the file to the instance of the function based on having located the instance of the function within the file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as computing device 202 in FIG. 2. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate locating functions for later interception. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to locate functions for later interception. For example, and as will be described in greater detail below, identification module 104 may identify a function 210 to be intercepted during an execution of a file 208 that comprises an instance of function 210. Next, procuring module 106 may procure, from a description of function 210, a string 212 that, when located in any given file within a set of files, indicates a location of function 210 within the given file. Immediately thereafter or at some later time, scanning module 108 may scan file 208 to identify a location of string 212 within file 208. Next, determination module 110 may determine, based on the location of string 212 within file 208, a location of the instance of function 210 within file 208. At some later time, intercepting module 112 may intercept a call made by a process during the execution of file 208 to the instance of function 210 based on having located the instance of function 210 within file 208.

Computing device 202 generally represents any type or form of computing device capable of reading computer-executable instructions. In some embodiments, computing device 202 may include a server configured to analyze files. In other embodiments, computing device 202 may include an end-user device. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

File 208 generally represents any type or form of computing file. Examples of file 208 include, without limitation, script files, source code files, and/or application files of all types. In some embodiments, file 208 may include a dynamic linked library (DLL) file. Function 210 generally represents any type or form of computing function. String 212 generally represents any type or form of sequence of characters.

Figure 3:
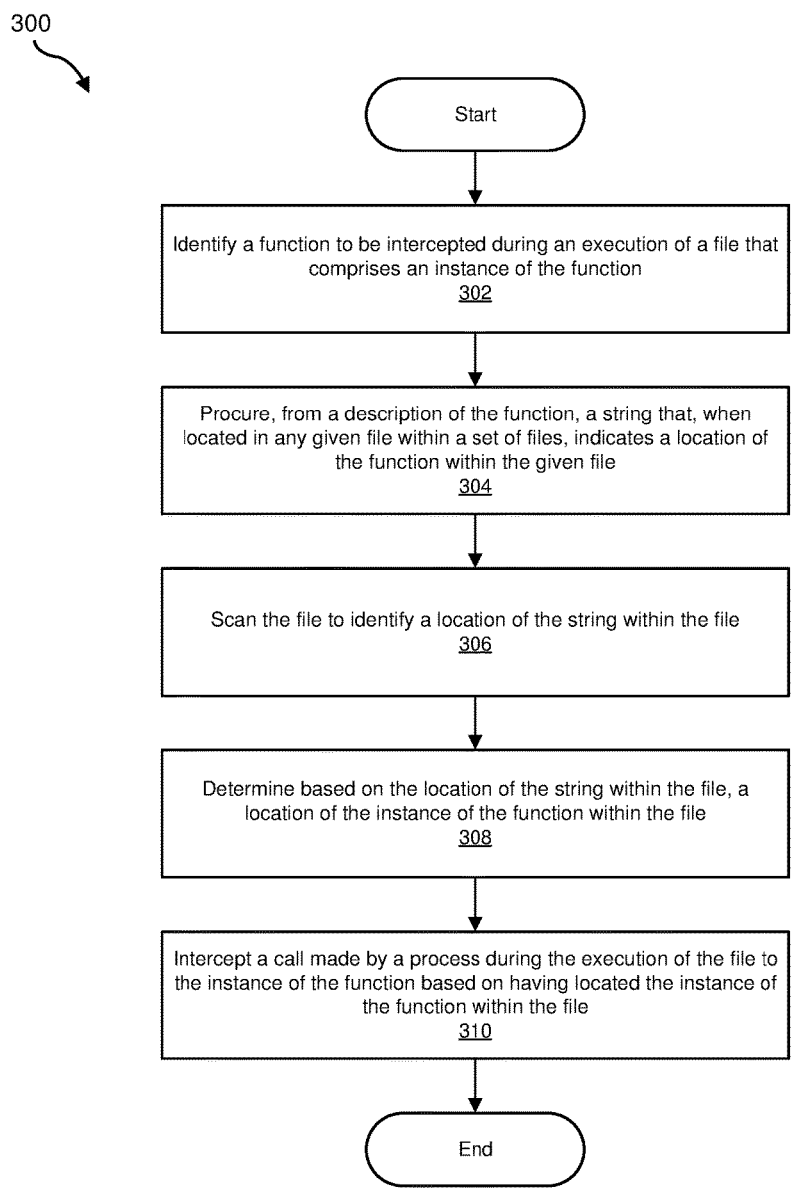
FIG. 3 is a flow diagram of an example method for locating functions for later interception.
Figure 4:
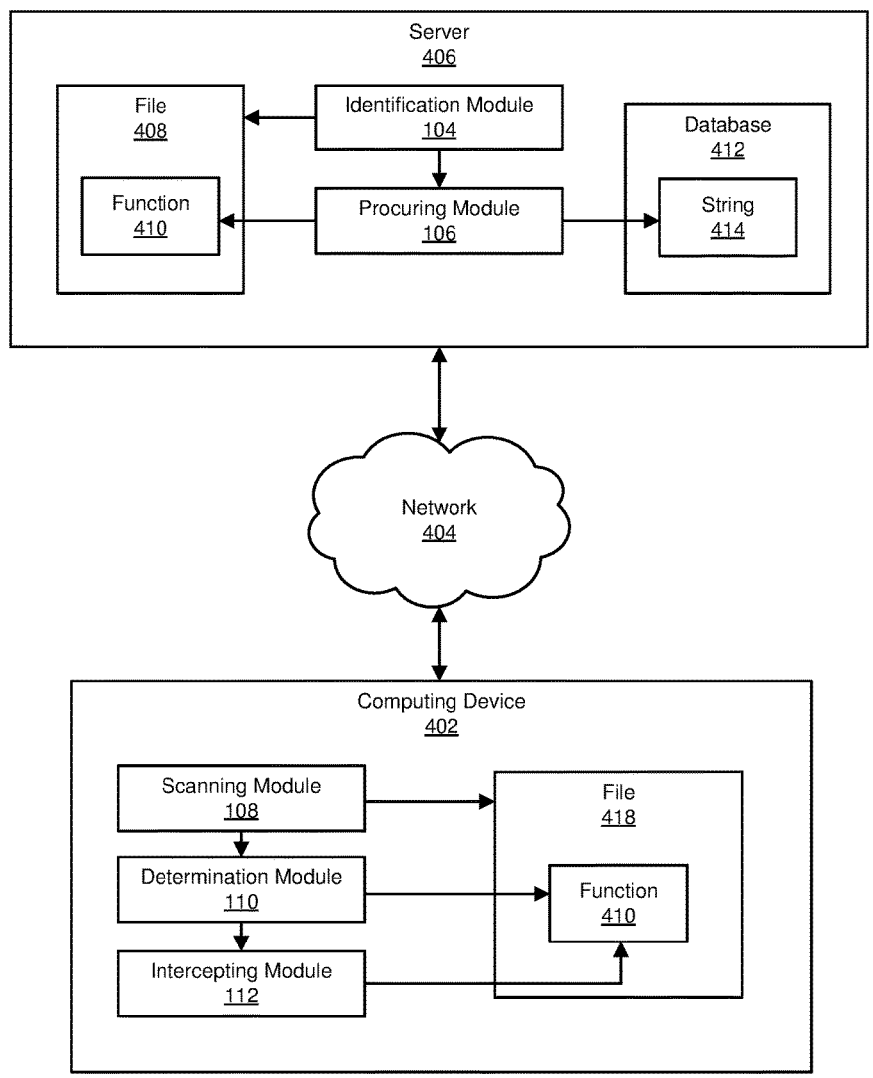
FIG. 4 is a block diagram of an example computing system for locating functions for later interception.

FIG. 3 is a flow diagram of an example computer-implemented method 300 for locating functions for later interception. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a function to be intercepted during an execution of a file that may include an instance of the function. For example, identification module 104 may, as part of computing device 202 in FIG. 2, identify function 210 to be intercepted during an execution of file 208 that may include an instance of function 210.

The term "function," as used herein, generally refers to any section of a script, application, and/or program that performs one or more specified computing tasks. In some embodiments, a function may be and/or include a routine, method, procedure, and/or sub-routine. In some examples, a function may be composed of one or more operations and/or commands. Examples of computing tasks performed by functions may include, without limitation, calling other functions, creating data, transforming data, deleting data, moving data, launching processes, terminating processes, and/or executing algorithms.

The term "file," as used herein, generally refers to any type of file that may include a function. Examples of a file that may include a function include, without limitation, library files, application files, source code files, script files, resource files, binary files, driver files, and/or executable files. In some embodiments, a file may be a library file used by an operating system to host shared functions that are accessible to applications executing on the operating system, such as a DLL file and/or an executable and linkable format (ELF) file. In some examples, a file may have multiple versions. For example, a DLL file may have versions that run on different operating systems, dated versions that incorporate different updates, and/or regional versions designed to work with various languages.

Identification module 104 may identify the function to be intercepted in a variety of ways and/or contexts. For example, identification module 104 may receive input from an administrator identifying the function. In another example, identification module 104 may receive input from another application identifying the function. For example, identification module 104 may receive input from a security application about a function to be intercepted for security reasons and/or input from an accessibility application about a function to be intercepted for accessibility reasons.

At step 304, one or more of the systems described herein may procure, from a description of the function, a string that, when located in any given file within a set of files, indicates a location of the function within the given file. For example, procuring module 106 may, as part of computing device 202 in FIG. 2, procure, from a description of function 210, string 212 that, when located in any given file 208 within a set of files, indicates a location of function 210 within the given file 208.

The term "description of the function," as used herein, generally refers to any information about a function that may be used to identify the function. In some examples, a description of a function may include the full code of the function. In other examples, a description of a function may include only a subset of the code within the function. In some examples, a description of a function may also include code from other functions, such as functions that call and/or are called by the function being described. In one embodiment, the description of the function may include an instance of the function in a previously analyzed file. For example, the file may be a DLL file for a certain version of an operating system and the previously analyzed file may be a DLL for a different version of the operating system. In this example, the description of the function may be some or all of the code from the instance of the function in the previously analyzed DLL file. In some examples, the description of the function may uniquely identify the function within the file. For example, the description of the function may be a series of instructions within the function that do not occur in any other functions in the file or in any other known versions of the file.

In some examples, the term "description of the function" may refer to a string used to describe the function. For example, a database may be populated with strings that serve to identify the locations of various functions when encountered in files that contain the functions (or when encountered in particular families of files that contain the functions).

The term "string," as used herein, generally refers to any sequence of characters. In some embodiments, a string may be composed of high-level programming language code, such as JAVA, RUBY, PERL, JAVASCRIPT, and/or C++. In some embodiments, a string may be composed of a sequence of machine language instructions, also known as opcodes. In some examples, the opcodes in the string may be represented in binary. For example, the opcode "add" may be represented as "1000 0000". In some examples, the string may use a binary (e.g., non-textual) encoding. For example, in some embodiments, the string may be a non-textual representation of the binary opcodes. In some embodiments, a string may be composed of multiple substrings that may be arranged in any order. For example, a string may be composed of the substrings "add $t0, $a0, 200" and "add $sp $sp 10". In this example, the string may match occurrences of both "add $t0, $a0, 200 add $sp $sp 10" and "add $sp $sp 10 add $t0, $a0, 200". In some examples, a string may include a combination of at least one static substring that only matches an exact copy of the static substring and at least one variable substring that matches substrings other than an exact copy of the variable substring. For example, a string may include "jump . . . ", where "jump" is a static substring that only matches the exact substring "jump" and " . . . " is a variable substring that matches any string of four characters. In some examples, a variable substring may match any substring of a specified length. In other examples, a variable substring may match any string that meets certain criteria, such as being composed only of digits, being composed only of alphanumeric characters, being composed only of spaces, having a certain character and/or certain type of character at a certain location within the string, and/or other criteria. In other examples, a variable substring may match any substring that is located at a specified place relative to one or more static substrings. For example, the string "if (.*==true) then" may include a variable substring ".*" that matches any substring found between the substrings "if (" and "==true then". In some embodiments, the string may not include a function definition of the function.

Procuring module 106 may procure the string from the description of the function in a variety of ways. In some embodiments, procuring module 106 may convey the description of the function to an administrator, who may create the string. In one example, procuring module 106 may display the description of the function in a graphical user interface that also enables the administrator to input the string. In another example, procuring module 106 may display the description of the function in a command line interface that also enables the administrator to input the string. Additionally or alternatively, procuring module 106 may automatically derive the string from the description of the function by performing an analysis of the description of the function. In some examples, the description of the function may include a database entry that includes the string. Accordingly, procuring module 106 may procure the string from the description of the function by querying a database for the string. For example, procuring module 106 may query a database populated with strings that, when encountered in files, identify the locations of functions. In some examples, procuring module 106 may query the database with the function (e.g., a name and/or identifier of the function). Additionally or alternatively, procuring module 106 may query the database with the file (e.g., a name and/or identifier of the file and/or an identifier of a family of file variants to which the file belongs).

In one embodiment, procuring module 106 may procure the string from the description of the function by determining that the string includes a series of instructions within the function that uniquely identify the function within the set of files. In some examples, procuring module 106 may analyze the code of the function and/or the code of the file to isolate a series of instructions that are present within the function but that are not present in the same arrangement elsewhere in the file.

At step 306, one or more of the systems described herein may scan the file to identify a location of the string within the file. For example, scanning module 108 may, as part of computing device 202 in FIG. 2, scan file 208 to identify a location of string 212 within file 208.

Scanning module 108 may scan the file in a variety of ways. For example, scanning module 108 may scan the file using any appropriate string matching algorithm, including but not limited to RABIN-KARP, KNUTH-MORRIS-PRATT, and/or a finite state automaton. In some examples, scanning module 108 may scan the file using regular expressions to match the string.

In some examples, scanning module 108 may scan the file to identify the location of the string within the file by identifying a possible location of the string within the file, identifying information at the possible location of the string within the file that indicates a presence of additional information about the location of the function at an additional location within the file, and searching for the additional information about the function at the additional location within the file. In some examples, the systems described herein may determine that, in order to identify the location of a function, it is useful to gather information about functions called by the function. In one example, scanning module 108 may identify a probable location of the function, find a function call at the probable location, follow the function call to the location of the called function, and gather information about the called function at that location. For example, the systems described herein may identify a function to be intercepted that is similar to another function but that calls different functions that include different instructions. In this example, the systems described herein may differentiate the function to be intercepted from the similar function by following function calls made by both functions to determine the nature of the functions being called and, based on determining the nature of the functions being called, determine which function is the function to be intercepted.

In some examples, scanning module 108 may identify the information at the possible location of the string within the file by identifying a conditional branching instruction that branches to the additional location and may scan for the additional information about the function at the additional location by following the conditional branching instruction to the additional location. Examples of conditional branching instructions may include, without limitation, "if" statements, "else if" statements, "select" statements, and/or "switch" statements. In some examples, scanning module 108 may follow both branches of a conditional branching instruction. For example, if the conditional branching instruction indicates that scanning module 108 should jump to a first memory address in one case and a second memory address in another case, scanning module 108 may scan both addresses consecutively and/or concurrently.

In some examples, the string may be composed of substrings and scanning module 108 may scan the file to identify the location of the string within the file by scanning the file for different orderings of the set of substrings. In some examples, scanning module 108 may scan for all possible orderings of the set of substrings. In other examples, scanning module 108 may scan for specified orderings of the set of substrings. For example, if the string is composed of substring A, substring B, and substring C, scanning module 108 may scan for ABC, BAC, and/or CAB, but may not scan for other potential orderings of the three substrings.

At step 308, one or more of the systems described herein may determine, based on the location of the string within the file, a location of the instance of the function within the file. For example, determination module 110 may, as part of computing device 202 in FIG. 2, determine, based on the location of string 212 within file 208, a location of the instance of function 210 within file 208.

Determination module 110 may determine the location of the instance of the function in a variety of ways. In some examples, determination module 110 may determine that the location of the instance of the function is the same as the location of the instance of the string. In other examples, determination module 110 may determine that the location of the function is offset from the location of the string. For example, if the string is a set of instructions that are ten lines down from the start of the function, determination module 110 may determine that the location of the function is ten lines up from the location of the string.

At step 310, one or more of the systems described herein may intercept a call made by a process during the execution of the file to the instance of the function based on having located the instance of the function within the file. For example, intercepting module 112 may, as part of computing device 202 in FIG. 2, intercept a call made by a process during the execution of file 208 to the instance of function 210 based on having located the instance of function 210 within file 208.

Intercepting module 112 may intercept a call made to a function in a variety of contexts. For example, intercepting module 112 may intercept a call to a function to send data over a network in order to perform a privacy scan on the data to ensure that no sensitive information is being transmitted. In another example, intercepting module 112 may intercept a call to a function to receive data from a network in order to perform a security scan to ensure that the incoming data is not malicious. In some examples, intercepting module 112 may intercept a function call made by a web browser process. In other examples, intercepting module 112 may intercept a function call made by another type of application, such as a networking application, a document processing application, a security application, a messaging application, a media application, and/or any other type of application.

In some examples, after intercepting the function call, intercepting module 112 may redirect the function call to a predetermined replacement function. In some examples, the predetermined replacement function may call the intercepted function and may perform additional operations before and/or after calling the intercepted function. In some examples, the predetermined replacement function may call the intercepted function only under certain conditions and/or with parameters that differ from those used in originally calling the intercepted function. For example, interception module 112 may redirect a call to a data transmission function to a replacement function that inspects the data before determining whether to transmit the data.

In some examples, interception module 112 may block the intercepted function call instead of redirecting the function call. For example, interception module 112 may intercept a function call made by a suspicious application and may block the function call in response to determining that the calling application is potentially malicious.

In some embodiments, some of modules 102 may be hosted on a server while others of modules 102 may be hosted on an end-user computing device. For example, as illustrated in FIG. 4, identification module 104 may be hosted on a server 406 and may identify a file 408 that is stored on server 406 and that includes a function 410 to be intercepted. In some examples, file 408 may be a version of a DLL. In some embodiments, procuring module 106 may also be stored on server 406 and may procure a string 414 that, when located, indicates the location of function 410 in any version of the DLL. In one embodiment, procuring module 106 may store string 414 in a database of strings that indicate the locations of various functions in various files.

In some embodiments, server 406 may communicate with a computing device 402 via a network 404. In some examples, server 406 may be a remote (i.e., cloud) server that communicates with computing device 402 via the Internet. In some examples, the systems described herein may identify file 418 on computing device 402 as a version of file 408 that contains an instance of function 410. In one example, scanning module 108 on computing device 402 may request string 414 from database 412 on server 406 and may then scan file 418 for string 414. In some examples, after scanning module 108 has located string 414 in file 418, determination module 110, also hosted on computing device 402, may determine the location of function 410 in file 418. At some later point, intercepting module 112 may detect a call to function 410 in file 418 by a process executing on computing device 402 and may intercept and redirect the call to function 410.

Figure 5:
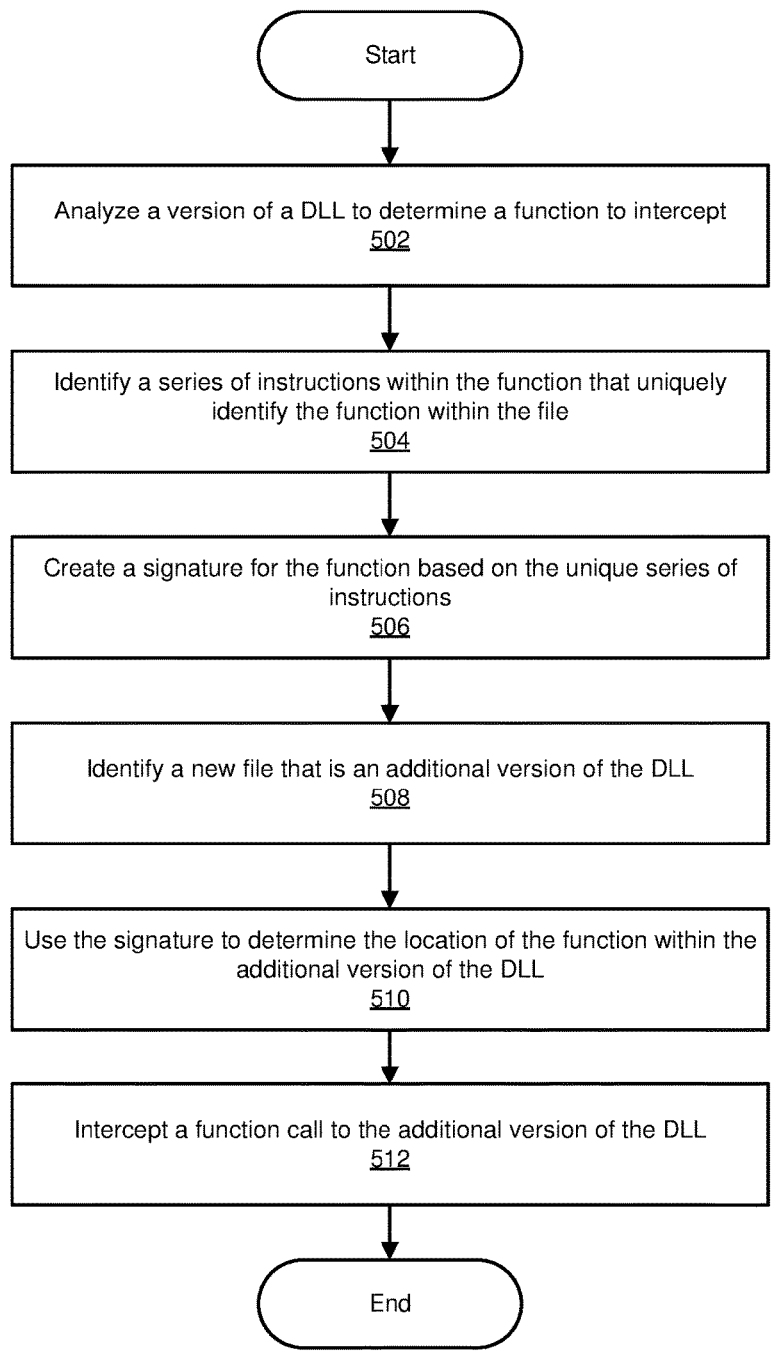
FIG. 5 is a block diagram of an additional example method for locating functions for later interception.

In some examples, the systems described herein may dynamically intercept a function within a DLL. As illustrated in FIG. 5, at step 502, the systems described herein may analyze a version of a DLL in order to determine a function to intercept. For example, the systems described herein may analyze a DLL that stores functions for data transmission in order to determine which function within the DLL handles sending data via a browser. At step 504, the systems described herein may identify a series of instructions within the function that uniquely identify the function in the file. In some embodiments, the systems described herein may first convert the file to a binary representation of the machine language code of the file and may identify the unique series of instructions in the binary version of the file. In some embodiments, the systems described herein may automatically identify the unique series of instructions via an algorithm.

At step 506, the systems described herein may create a signature for the function based on the unique series of instructions. In some examples, the signature may be the unique series of instructions. In other examples, parts of the unique series of instructions may be replaced by variables. For example, memory addresses may be replaced by variables so that different addresses in different versions of the file do not prevent the signature from matching. In another example, the unique series of instructions may be broken down into substrings which may match multiple orders of the instructions, in order to account for compiler optimizations in different versions of the DLL that may re-order the instructions from the version found in the file used to construct the signature. In some examples, each substring may be a single CPU instruction.

At step 508, the systems described herein may identify a new file that is an additional version of the DLL. In some examples, the additional version may be a localized version of the DLL. In other examples, the additional versions may be a newer version of the DLL. In one example, the additional version may have the same version information stored in metadata about the file as the original version but may in fact be different and may store the function in a different location. At step 510, the systems described herein may use the signature created in step 506 to determine the location of the function within the additional version of the DLL. At some later time, when the function is called, at step 512, the systems described herein may use the location of the function to enable the systems described herein to intercept a function call to the instance of the function in the additional version of the DLL. In some examples, the systems described herein may then redirect the function to a replacement function stored elsewhere.

As described in connection with method 300 above, by using string-scanning techniques to dynamically locate functions to be intercepted in newly encountered versions of previously analyzed files, the systems and methods described herein may enable applications to efficiently locate functions for interception, improving the ability of those applications to carry out various tasks in areas such as security, privacy, and others. The systems and methods described herein may increase efficiency by enabling applications to use information from previously analyzed files to locate functions in new files without having to perform a full analysis on the new file. By using strings that may include variables and/or be broken up into substrings that may be scanned for in any order, the systems and methods described herein may enable matching across different versions of files even when compiler optimizations have changed the ordering and/or memory addresses of instructions.

Figure 6:
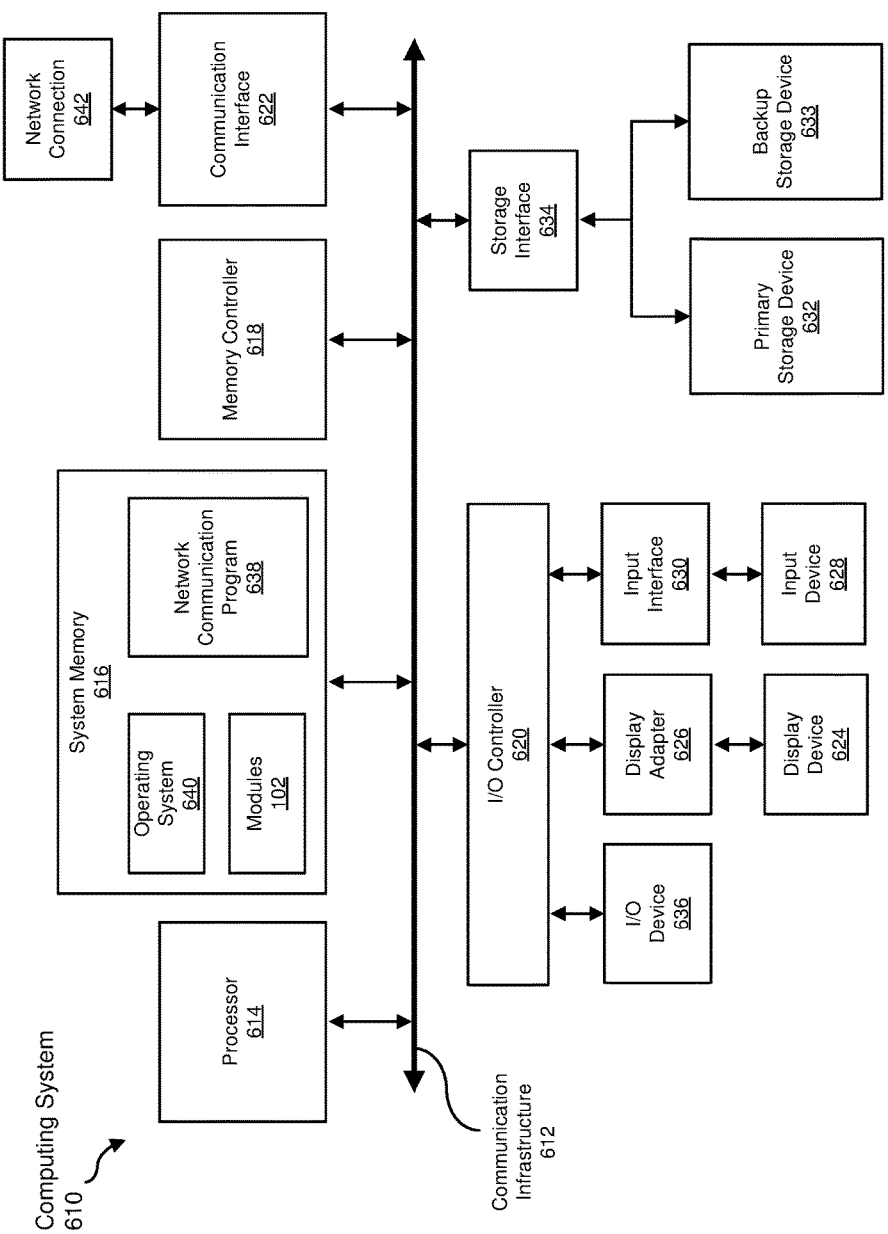
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636.

In this example, I/O device 636 may include and/or represent a user interface that facilitates human interaction with computing system 610. Examples of I/O device 636 include, without limitation, a computer mouse, a keyboard, a monitor, a printer, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
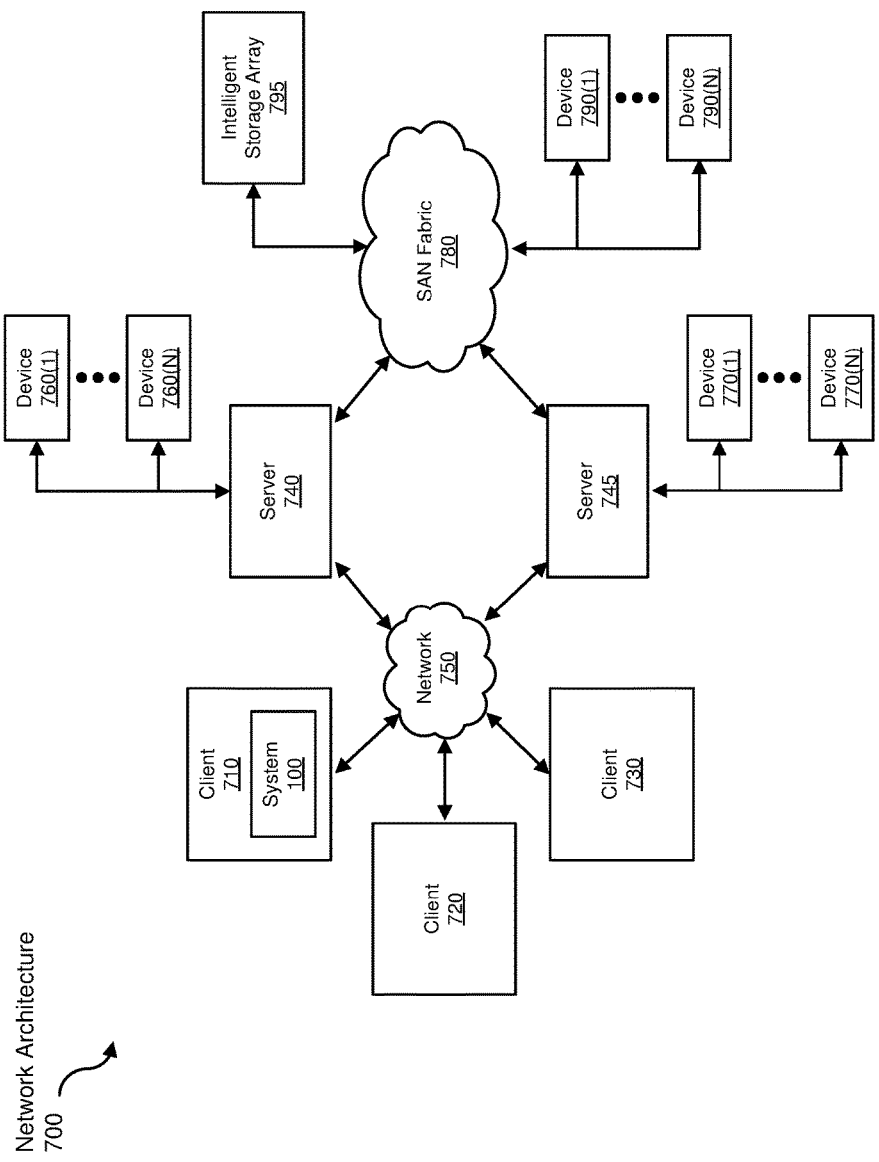
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for locating functions for later interception.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive file data to be transformed, transform the file data by extracting functions from the file, output a result of the transformation to a module that analyzes functions, use the result of the transformation to create signatures for functions, and store the result of the transformation to a file and/or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for locating functions for later interception, at least a portion of the method being performed by a computing device comprising at least one processor, the method comprising:
   identifying a function to be intercepted during an execution of a file that comprises an instance of the function;
   procuring, from a description of the function, a string that, when located in any given file within a set of files, indicates a location of the function within the given file, wherein the string comprises a series of instructions within the function that uniquely identify the function within the set of files;

scanning the file to identify a location of the string within the file;

determining, based on the location of the string within the file, a location of the instance of the function within the file; and intercepting a call made by a process during the execution of the file to the instance of the function based on having located the instance of the function within the file.

2. The computer-implemented method of claim 1, wherein the file comprises a dynamic linked library.

3. The computer-implemented method of claim 1, wherein the description of the function comprises an instance of the function in a previously analyzed file.

4. The computer-implemented method of claim 1, wherein the string comprises a sequence of opcodes.

5. The computer-implemented method of claim 1, wherein the string comprises a combination of at least one static substring that only matches an exact copy of the static substring and at least one variable substring that matches substrings other than an exact copy of the variable substring.

6. The computer-implemented method of claim 1, wherein the set of files comprises a plurality of versions of the file.

7. The computer-implemented method of claim 1, wherein scanning the file to identify the location of the string within the file comprises:
identifying a possible location of the string within the file;
identifying information at the possible location of the string within the file that indicates a presence of additional information about the location of the function at an additional location within the file; and
searching for the additional information about the function at the additional location within the file.

8. The computer-implemented method of claim 7, wherein:
identifying the information at the possible location of the string within the file comprises identifying a conditional branching instruction that branches to the additional location; and
searching for the additional information about the function at the additional location comprises following the conditional branching instruction to the additional location.

9. The computer-implemented method of claim 1, wherein:
the string comprises a set of substrings; and
scanning the file to identify the location of the string within the file comprises scanning the file for a plurality of different orderings of the set of substrings.

10. The computer-implemented method of claim 1, further comprising redirecting the intercepted call made by the process to a predetermined replacement function.

11. The computer-implemented method of claim 1, wherein the series of instructions do not occur in another function in the file or in another version of the file.

12. A system for locating functions for later interception, the system comprising:
an identification module, stored in memory, that identifies a function to be intercepted during an execution of a file that comprises an instance of the function;
a procuring module, stored in memory, that procures, from a description of the function, a string that, when located in any given file within a set of files, indicates a location of the function within the given file, wherein the string comprises a series of instructions within the function that uniquely identify the function within the set of files;
a scanning module, stored in memory, that scans the file to identify a location of the string within the file;
a determination module, stored in memory, that determines, based on the location of the string within the file, a location of the instance of the function within the file;
an intercepting module, stored in memory, that intercepts a call made by a process during the execution of the file to the instance of the function based on having located the instance of the function within the file; and
at least one physical processor configured to execute the identification module, the procuring module, the scanning module, the determination module, and the intercepting module.

13. The system of claim 12, wherein the file comprises a dynamic linked library.

14. The system of claim 12, wherein the description of the function comprises an instance of the function in a previously analyzed file.

15. The system of claim 12, wherein the string comprises a sequence of opcodes.

16. The system of claim 12, wherein the string comprises a combination of at least one static substring that only matches an exact copy of the static substring and at least one variable substring that matches substrings other than an exact copy of the variable substring.

17. The system of claim 12, wherein the set of files comprises a plurality of versions of the file.

18. The system of claim 12, wherein the scanning module scans the file to identify the location of the string within the file by:
identifying a possible location of the string within the file;
identifying information at the possible location of the string within the file that indicates a presence of additional information about the location of the function at an additional location within the file; and
searching for the additional information about the function at the additional location within the file.

19. A non-transitory computer-readable medium comprising one or more computer-readable instructions that, when executed by at least one processor of a computing device, cause the computing device to:
identify a function to be intercepted during an execution of a file that comprises an instance of the function;
procure, from a description of the function, a string that, when located in any given file within a set of files, indicates a location of the function within the given file, wherein the string comprises a series of instructions within the function that uniquely identify the function within the set of files;
scan the file to identify a location of the string within the file;
determine, based on the location of the string within the file, a location of the instance of the function within the file; and
intercept a call made by a process during the execution of the file to the instance of the function based on having located the instance of the function within the file.

* * * * *